United States Patent Office 3,058,889
Patented Oct. 16, 1962

3,058,889
MICROBIAL PROCESS FOR PREPARING
6β-HYDROXYTESTOLOLACTONE
Josef Fried, Princeton, and Richard W. Thoma, Somerville, N.J., assignors to Olin Mathieson Chemical Corporation, New York, N.Y., a corporation of Virginia
No Drawing. Original application Jan. 6, 1956, Ser. No. 557,645. Divided and this application May 25, 1961, Ser. No. 112,539
1 Claim. (Cl. 195—51)

This application is a division of our application, Serial No. 557,645, filed January 6, 1956, now abandoned.

This invention relates to, and has for its object, the provision of a process for preparing a steroid of the formula

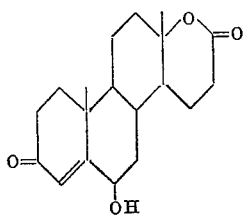

This compound 6β-hydroxytestololactone is a pharmacologically-active steroid, useful as a protein-anabolic agent. Hence the new steroid of this invention can be used in lieu of known protein-anabolic steroids, and may be administered either perorally or parenterally in the treatment of post-operative shock and other conditions where tissue degeneration has occurred, being formulated for such administration in the same type of preparations as testosterone, for example, with concentration and/or dosage based on the activity of the particular compound.

6β-hydroxytestololactone can be prepared by the process of this invention from testololactone by subjecting the latter to the action of enzymes of *Coniothyrium helleborine* or to the action of the organism itself under oxidizing and preferably aerobic conditions.

To prepare the steroid of this invention, testololactone is subjected to the action of enzymes of the microorganism *Coniothyrium helleborine* under oxidizing conditions. This oxidation can best be effected by either including testololactone in an aerobic culture of the microorganism, or by bringing together, in an aqueous medium, the steroid, air, and enzymes of non-proliferating cells of the microorganism.

In general, the conditions of culturing *Coniothyrium helleborine* for the purposes of this invention are (except for the inclusion of the testololactone to be converted) the same as those of culturing various other molds for the production of antibiotics and/or vitamin $B_{12}$, i.e., the microorganism is aerobically grown in contact with (in or on) a suitable fermentation medium. A suitable medium essentially comprises a source of carbon and energy. The latter may be a carbohydrate (such as sucrose, molasses, glucose, maltose, starch, or dextrin), a fatty acid, a fat and/or the steroid itself. Preferably, however, the medium includes an assimilable source of carbon and energy in addition to the steroid. Among the fats utilizable for the purpose of this invention are: lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein, and trilaurin. Among the fatty acids utilizable for the purpose of this invention are: stearic acid, palmitic acid, oleic acid, linoleic acid, and myristic acid.

The source of nitrogenous factors may be organic (e.g. soybean meal, corn steep liquor, meat extract and/or distillers solubles) or synthetic (i.e. composed of simple, synthesizable organic or inorganic compounds such as ammonium salts, alkali nitrates, amino acids or urea).

An adequate sterile-air supply should be maintained during fermentation, for example by the conventional methods of exposing a large surface of the medium to air or by utilizing submerged aerated culture. The steroid may be added to the culture during the incubation period, or included in the medium prior to sterilization or inoculation. The preferred (but not limiting) range of concentration of the steroid in the culture is about 0.01 to 0.10%. The culture period (or rather the time of subjecting the steroid to the action of the enzyme) may vary considerably, the range of about 6 to 96 hours being feasible, but not limiting.

The process yields, inter alia, 6β-hydroxytestololactone, which may be separated from the broth by extraction and from other concomitantly produced steroids by fractional crystallization.

The following example is illustrative of the invention:

EXAMPLE

*6β-Hydroxytestololactone*

(a) *Fermentation.*—A fermentation medium of the following composition is prepared:

|   | G. |
|---|---|
| Cerelose | 44 |
| Starch | 20 |
| Peptone liquor | 20 |
| Malted cereal extract syrup | 10 |
| $NaNO_3$ | 3 |
| $KH_2PO_4$ | 1 |
| KCl | 0.5 |
| $MgSO_4 \cdot 7H_2O$ | 0.5 |
| $FeSO_4$ | 0.01 |

Water to make one liter.

The pH of the medium is adjusted to 7.0±0.1 with 2 N NaOH solution, and 50 ml. portions of the medium are distributed in 250 ml. Erlenmeyer flasks, the flasks plugged with cotton and sterilized by autoclaving for 30 minutes at 120° C. When cool, each of the flasks is inoculated with 2.5 ml. of a suspension of the sporulated growth of a 15 day old cracked corn [15 g. cracked corn; 20 ml. distilled water] culture of the organism, the suspension being made in 150 ml. of water with 0.01% Duponol as wetting agent. The organism is *Coniothyrium helleborine* or derived strains thereof; the parent organism is obtainable, inter alia, from the Kansas State College Department of Botany.

The flasks are then mechanically shaken for 69 hours at 25° C. on a 280 cycle per minute rotary shaker, after which about 6% (v./v.) is transferred to each of 24 flasks containing 50 ml. of the following medium:

|   | G. |
|---|---|
| Glucose | 40 |
| $NaNO_3$ | 3 |
| $KH_2PO_4$ | 1 |
| KCl | 0.5 |
| $MgSO_4 \cdot 7H_2O$ | 0.5 |
| $FeSO_4 \cdot 7H_2O$ | 0.02 |

Water to make one liter.

After 24 hours incubation, a total of 300 mg. of testololactone is added in 12 ml. of absolute methanol (0.5 ml. per flask). The flasks are then incubated an additional 48 hours, after which the flasks are harvested and the contents filtered through cheesecloth and washed with 250 ml. of water. The total volume of filtrate and wash is 1280 ml.

(b) *Isolation of 6β-hydroxytestololactone.*—The thus-obtained culture filtrate is extracted with three 800 ml. portions of chloroform and the chloroform solution evaporated to dryness in vacuo. The residue from the chloroform solution (about 305 mg.) is separated into the two components 6β-hydroxytestololactone and 7α-hydroxytestololactone by fractional crystallization from methanol.

The more soluble 6β-hydroxytestololactone (about 84 mg.) after recrystallization from acetone has the following properties: M.P. about 235–236°; $[\alpha]_D^{23} -13°$ (c., 0.75 in chloroform);

$\lambda_{max}^{alc.}$ 236 mµ ($\epsilon = 15,400$); $\lambda_{max}^{Nujol}$ 2.89µ (OH); 5.80µ (lactone carbonyl); 6.01µ, 6.18µ ($\Delta^4$-3-ketone)

Analysis.—Calculated for $C_{19}H_{26}O_4$ (318.40): C, 71.67; H, 8.23. Found: C, 71.37; H, 7.96.

What is claimed is:

A process for preparing a 6β-hydroxytestololactone, which comprises subjecting testololactone to the action of enzymes of *Coniothyrium helleborine* under aerobic conditions and recovering the 6β-hydroxytestololactone formed.

References Cited in the file of this patent

UNITED STATES PATENTS

| | | |
|---|---|---|
| 2,697,715 | Eppstein et al. | Dec. 21, 1954 |
| 2,721,828 | Murray et al. | Oct. 25, 1955 |